Jan. 7, 1958 W. C. ASLESEN 2,818,794
FOOD WARMING DEVICE
Filed Aug. 26, 1954
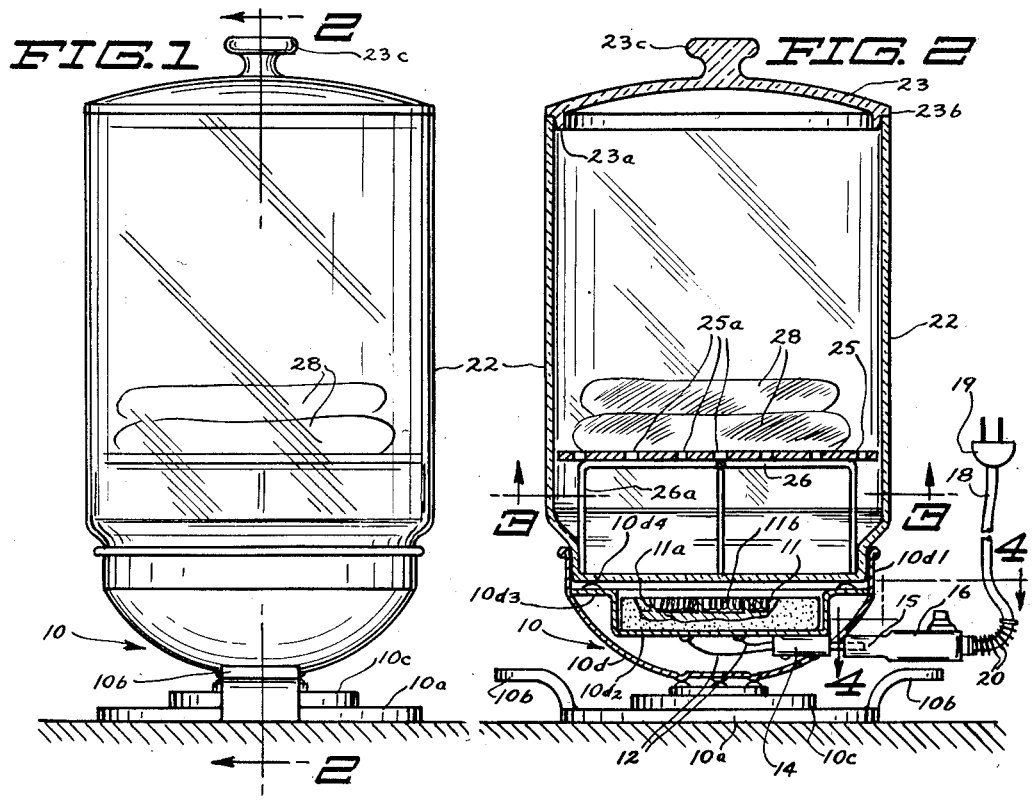
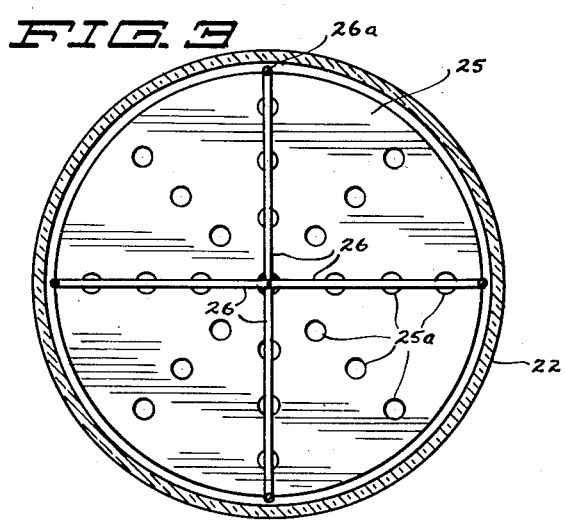
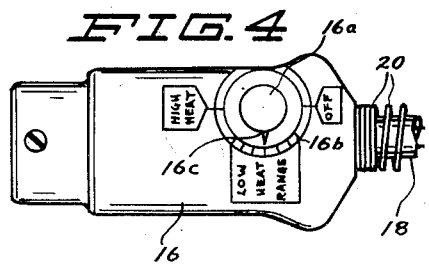
INVENTOR.
WILLIAM C. ASLESEN
BY Chas. C. Reif,
ATTORNEY.

United States Patent Office 2,818,794
Patented Jan. 7, 1958

2,818,794

FOOD WARMING DEVICE

William C. Aslesen, Minneapolis, Minn.

Application August 26, 1954, Serial No. 452,420

2 Claims. (Cl. 99—341)

This invention relates to a device for warming or heating articles of food, such as wieners, other meat, baked articles and other articles of food.

It is desirable to have a simple and easily operated heating device for warming up or heating articles of food which can be placed on a dining table and hold the articles where they are within easy reach of the server.

It is an object of this invention therefore to provide a simple and easily operated device comprising a container made of refractory material, such as glass, a heating means for heating said container, a supporting means within said container for supporting the food to be heated and disposed above the bottom of said container, said container being adapted to hold a certain amount of water, and a removable cover for said container.

It is more specifically an object of the invention to provide a heating device for food, such as wieners, comprising a base member having a lower plate-like portion with handles at each side thereof and having an upwardly extending bowl-like portion, a heating means, such as an electrical heating means disposed in said latter portion, a container made of material, such as glass, supported in the upper portion of said bowl-like portion, and adapted to contain a certain amount of water, and having its bottom extending over and adjacent said heating means, a supporting member for food disposed above the bottom of said container, and a removable cover for the top of said container.

These and other objects and advantages of the invention will be fully set forth in the following description made in connection with the accompanying drawings in which like reference characters refer to similar parts throughout the several views and in which:

Fig. 1 is a view in side elevation of the device of this invention;

Fig. 2 is a central vertical section taken at right angles to the plane of the drawing, as indicated by line 2—2 of Figure 1;

Fig. 3 is a horizontal section taken on line 3—3 of Fig. 2; and

Fig. 4 is a partial plan view as seen from line 4—4 of Figure 2.

Referring to the drawings, a heating device for food is shown comprising a base member 10. Said member comprises a plate-like lower portion 10a illustrated as being cylindrical in form, the same having upstanding and outwardly extending handle portions 10b at either side thereof. Said base member has an upstanding plate-like portion 10c which supports a bowl-like portion 10d. Portion 10d has a semi-spherical form and at its upper end is provided with a cylindrical flange 10d1. A receptacle-like portion or pocket 10d2 is formed in portion 10d, the same having a horizontal flange 10d3 extending outwardly thereabout at its top. A heating element 11 is disposed in portion 10d2, and while various kinds of heating elements might be used, in the embodiment of the invention illustrated an electrical heating element is shown, the same having a grid portion 11a and a heating coil 11b. Conductors 12 extend from heating coil 11b and into a holding portion 14 and are connected respectively to pins 15 which project at one side of the base member 10. A plug 16 has apertures in one end and can be pushed over the pins 15 to connect the heating coil 11b to an electric cord 18 having the usual connecting plug 19 at one end. Plug 16 is preferably of the type having an adjusting knob 16a which can be rotated to several positions indicated by spaced radial lines 16b. Member 16a has a pointer 16c to indicate the position of member 16. As shown, member 16 can be set for several positions in a low heat range and to a position for high heat. A flexible coiled spring 20 surrounds the portion of cord 18 adjacent plug 16. It may be stated that the heating element 11 and the plug 16 and connected parts per se form no part of the present invention but are well known articles of commerce. The flange 10d3 has upstanding therefrom circumferentially spaced projections 10d4 illustrated as substantially semi-spherical in form.

A container 22 is provided, and while this may be made of various materials, it preferably is made of a refractory material, such as glass. Container 22 is open at its top and provided with a slightly upwardly curved cover 23 having a downwardly extending flange 23a fitting within the top of container 22 having a portion 23b resting on the top of container 22. Cover 23 is provided with a knob handle 23c. The bottom of container 22 rests on the projections 10d4. Container 22 is shown as having a lower portion reduced in diameter which substantially fits within flange 10d1. A supporting member 25 is disposed within container 22 some distance above the bottom thereof and extends to within a short distance of the wall of container 22. Member 25 is preferably provided with a series of openings or perforations 25a. Member 25 is supported by a plurality of circumferentially spaced legs 26a extending downwardly from horizontal portions 26, which latter portions are joined at their inner ends.

In operation, the food to be warmed or heated, such as wieners 28, will be placed upon the supporting member or disk 25, as shown in Figs. 1 and 2. A certain amount of water will be placed in container 22, the level of such water preferably being below disk 25. The plug 16 will be inserted in the usual current supplying socket and the heating device will be heated. The desired degree of heat can be had by positioning knob 16a in the proper position. With the lid 23 in place, the water will be heated and the vapor or steam and the radiation therefrom will heat the food articles on member 25 to the desired degree. The vapor furnished by the water will prevent the articles from being objectionably dried out. The articles can be easily placed in container 22 and removed therefrom by removing the cover 23. The device can be easily carried from place to place by taking hold of the handles 10b. The container 22 is readily removable from the base member 10 and member 25 with the leg member 26 can be easily removed therefrom. Said parts can then be easily cleaned. The base member is finished in quite an ornamental manner. While this can be done in many ways, in practice the plate-like portion 10a and handles 10b have been made of a black substance of plastic nature while the bowl-shaped portion 10d has been made of metal with a polished coating.

From the above description it will be seen that I have provided quite a simple, very efficient and very useful device for heating many food articles. The device is particularly useful in heating wieners and other cooked meat articles, as well as rolls and other bakery products. The device can be placed on the dining table and the articles readily served directly therefrom. A very convenient and suitable device is thus had for heating the desired articles without using regular pans or other cooking utensils in connection with a stove. The device has been amply demonstrated in actual practice and found to be very successful and efficient.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A food warming device having in combination, a base member having a plate-like handle equipped supporting portion of wide extent and a bowl-shaped upper portion having a narrow bottom portion secured to said first mentioned portion and having a chamber therein, a member in said chamber having an outer horizontal annular flange in said chamber and supported on the inner wall of said bowl-shaped portion, said member having a depending receptacle formed therein within said flange, a heating device disposed in said receptacle, annularly arranged spaced supporting members of small height on said flange, said base member having an upper cylindrical terminal wall portion, a jar having a lower bottom portion fitting within said wall portion and having a bottom resting on said spaced supporting members, said jar being liftable from said members and wall portion without rotation, a frame having spaced horizontal rod-like portions which are bent downwardly to form spaced legs supported on the bottom of said jar close to the wall thereof, a perforated plate supported on said horizontal portions and a removable cover for the top of said jar disposed a comparatively long distance above said perforated plate, whereby a vertically elongated chamber is formed in said jar to receive layers of wieners supported on said plate to be warmed and steamed and kept ready for serving.

2. A food warming device having in combination, a base member having a plate-like supporting portion of comparatively great diameter and an upper upwardly flaring portion having a narrow bottom portion secured to said portion and having a chamber therein, a plate supported in and by the wall of said chamber having a second chamber therein, a heating element disposed within said second chamber and supported by said plate, a vertically elongated jar of transparent material adapted to contain water and having a bottom portion of reduced transverse dimension, said base member having an upper terminal flange within which said portion removably fits, said jar being supported on said plate, a frame formed of wires or rods having horizontal portions at an angle to each other and circumferentially spaced vertical leg portions resting on and supported by the bottom of said jar closely adjacent the wall thereof, a perforated plate supported on said horizontal portions on which food, such as wieners, can be placed in layers to be heated and steamed, and a cover of small vertical dimension for closing the top of said jar spaced quite a distance above said plate whereby a vertically elongated chamber is formed above said plate adapted to contain wieners supported on said plate.

References Cited in the file of this patent

UNITED STATES PATENTS

| | | |
|---|---|---|
| 222,296 | McMurray | Dec. 2, 1879 |
| 568,151 | Ackermann | Sept. 22, 1896 |
| 1,043,667 | Carpenter | Nov. 5, 1912 |
| 1,477,340 | Forshee | Dec. 11, 1923 |
| 1,624,989 | Smith et al. | Apr. 19, 1927 |
| 1,756,787 | Goughnour | Apr. 29, 1930 |
| 1,816,994 | Armstrong | Aug. 4, 1931 |
| 1,850,131 | Mennicke | Mar. 22, 1932 |
| 1,871,654 | Blier | Aug. 16, 1932 |
| 1,956,067 | Herz | Apr. 24, 1934 |
| 2,012,981 | Wilsey | Sept. 3, 1935 |
| 2,042,993 | Hopes | June 2, 1936 |
| 2,422,974 | Newell | June 24, 1947 |
| 2,605,382 | Kircher et al. | July 29, 1952 |